(12) United States Patent
Oki

(10) Patent No.: US 8,587,629 B2
(45) Date of Patent: Nov. 19, 2013

(54) IMAGE-FORMING DEVICE AND LIGHT SCANNING DEVICE

(75) Inventor: Tsuneo Oki, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 13/617,038

(22) Filed: Sep. 14, 2012

(65) Prior Publication Data

US 2013/0076850 A1 Mar. 28, 2013

(30) Foreign Application Priority Data

Sep. 27, 2011 (JP) ................................. 2011-210288

(51) Int. Cl.
*B41J 2/385* (2006.01)
*B41J 2/41* (2006.01)
*B41J 2/435* (2006.01)

(52) U.S. Cl.
USPC ............ 347/263; 347/138; 347/152; 347/245

(58) Field of Classification Search
None
See application file for complete search history.

(56) References Cited

U.S. PATENT DOCUMENTS

2009/0269102 A1* 10/2009 Kaneko et al. ................. 399/123
2010/0183335 A1* 7/2010 Matsuo et al. ................. 399/207

FOREIGN PATENT DOCUMENTS

JP 2005-088412 A 4/2005
JP 2011154255 A * 8/2011

OTHER PUBLICATIONS

English Abstract for JP 2005-088412 A, published Apr. 7, 2005.

* cited by examiner

*Primary Examiner* — Matthew Luu
*Assistant Examiner* — Kendrick Liu
(74) *Attorney, Agent, or Firm* — NDQ&M Watchstone LLP

(57) ABSTRACT

An image-forming device is provided with a shutter member that has a ventilation passage formed extending therethrough in a main scanning direction, the shutter member adapted to slide over the outside surface of the housing in a secondary scanning direction, a cover member adapted to open or close an interior of a chassis of the device. The shutter member, when the cover member is moved in a direction to open up the inside of the device chassis, is moved in a direction to shut an output window, and when the cover member is moved in a direction to close up the inside of the device chassis, is moved in a direction to open the output window. In association with movement of the shutter member towards the open direction, the ventilation passage faces a ventilation opening of a duct furnished to the device chassis.

14 Claims, 8 Drawing Sheets

IMAGE-FORMING DEVICE AND LIGHT SCANNING DEVICE

This application is based on and claims the benefit of priority from Japanese Patent Application No. 2011-210288 filed on Sep. 27, 2011, the contents of which are hereby incorporated by reference.

BACKGROUND

The present disclosure relates to an image-forming device, such as a photocopier, printer, or fax, or an all-in-one device combining the functions thereof; and to a light scanning device employed in an image-forming device; and relates in particular to an image-forming device for scanned exposure of the surface of an image carrier, forming a latent image on the image carrier.

In a conventional image-forming device, a light scanning device performs a scanned exposure of the surface of an image carrier, forming a latent image on the image carrier. Such a light scanning device is extremely sensitive to particulate contaminants such as dust or dirt, and when particulate contaminants become deposited on optical components, such as lenses or mirrors, in the interior of the unit of the light scanning device, the beam of the light may become blocked by the particulate contaminants, reducing the amount of the light, and giving rise to image defects such as streaks and density irregularities. In order to prevent infiltration of such particulate contaminants into the interior of the unit, the light scanning device unit has a highly hermetic design. However, in order to form a latent image on the image carrier, the unit must have an opening through which the light beam is output onto the image carrier, and accordingly there is a risk of particulate contaminants infiltrating into the unit through the opening.

Accordingly, in the prior art, techniques for preventing infiltration of particulate contaminants into the interior of the unit through the opening for output of a light beam are known. In an image-forming device according to a first related art, a shutter member is arranged nearby the output window that outputs the light beam for forming a latent image on the image carrier. The shutter member can be moved by an actuating mechanism capable of opening and shutting the output window; and, when a latent image is formed on the image carrier or at other times of image formation, opens the output window and forms a latent image on the image carrier. The actuating mechanism operates in association with a cover member that opens and shuts the inside of the device chassis. When maintenance is performed, or the image carrier or another component disposed inside the device chassis is replaced, an operation is performed to open the cover member, whereupon the shutter member shuts the output window using the actuating mechanism. Doing this makes it difficult for toner, particulate contaminants, or the like to enter inside the light scanning device through the output window when the cover member is open.

Normally, in order to perform scanned exposure of the light beam over the image carrier, a rotating polygonal mirror for deflecting the light beam is caused to rotate at high speed, and the bearing section of the motor that drives the rotation of the rotating polygonal mirror emits heat. Moreover, electrical control components on the circuit board, such as the drive circuit for controlling driving of the motor, also emit heat. The heat generated by the motor bearing section and the electrical control components becomes trapped inside the light scanning device, and the housing reaches high temperature. When the light scanning device reaches high temperature, there is a risk that optical components such as lenses and mirrors will experience heat deformation. Heat deformation of optical components in turn poses a risk of an inability to form a good latent image on the surface of the image carrier.

SUMMARY

It is an object of the present disclosure to offer an image-forming device designed to make it difficult for toner, particulate contaminants, and the like to enter inside the housing of the light scanning device through the light beam output window, and that can sufficiently minimize any rise in temperature inside the housing; as well as a light scanning device for employment in the image-forming device.

The image-forming device according to one aspect of the present disclosure is provided with a light source section for outputting a light beam; a rotating polygonal mirror for scanning the light beam from the light source section in a main scanning direction; an image carrier that is irradiated by the light beam scanned by the rotating polygonal mirror, whereby a latent image is formed; a housing for housing the light source section and the rotating polygonal mirror, the housing having an output window through which the light beam scanned in the main scanning direction is outputted towards the image carrier; a shutter member that has a ventilation passage formed extending therethrough in the main scanning direction, the shutter member adapted to slide over the outside surface of the housing in a secondary scanning direction orthogonal to the main scanning direction in order to open and shut the output window; a cover member provided to open or close the interior of a chassis of the device; and an actuating mechanism for moving the shutter member to a position where the output window is opened or a position where the output window is closed, in association with an opening up or closing up operation performed by the cover member adapted to open up or close up the device chassis interior of the image formation device. The shutter member is moved to the closing position by the actuating mechanism when the cover member is opened up, and moved to the opening position by the actuating mechanism when the cover member is closed up. The ventilation passage faces a ventilation opening of a duct furnished to the device chassis when the shutter member is in the opening position.

The light scanning device according to another aspect of the present disclosure is provided with a light source section for outputting a light beam; a rotating polygonal mirror for scanning the light beam from the light source section in a main scanning direction; a housing for housing the light source section and the rotating polygonal mirror, the housing having an output window through which the light beam scanned in the main scanning direction is outputted towards a scanned surface; a shutter member that has a ventilation passage formed extending therethrough in the main scanning direction, the shutter member adapted to slide over the outside surface of the housing in a secondary scanning direction orthogonal to the main scanning direction in order to open and shut the output window; and an actuating mechanism for moving the shutter member to a position where the output window is opened or a position where the output window is closed, in association with an opening up or closing up operation performed by a cover member provided to open or close the interior of a chassis of a device to which the light scanning device is attached. The shutter member is moved to the closing position by the actuating mechanism when the cover member is opened up, and moved to the opening position by the actuating mechanism when the cover member is closed up. The ventilation passage faces the ventilation opening of a duct furnished to the device chassis when the shutter member is in the opening position.

Further objects of the present disclosure, and specific advantages afforded by the present disclosure, will be apparent from the description of the embodiments described hereinbelow.

DETAILED DESCRIPTION

Whereas the preferred embodiments of the present disclosure are described hereinbelow with reference to the drawings; the present disclosure is not limited by this embodiment, nor are the intended purposes of the disclosure, the terminology shown herein, or the like limited thereto.

Figure 1:
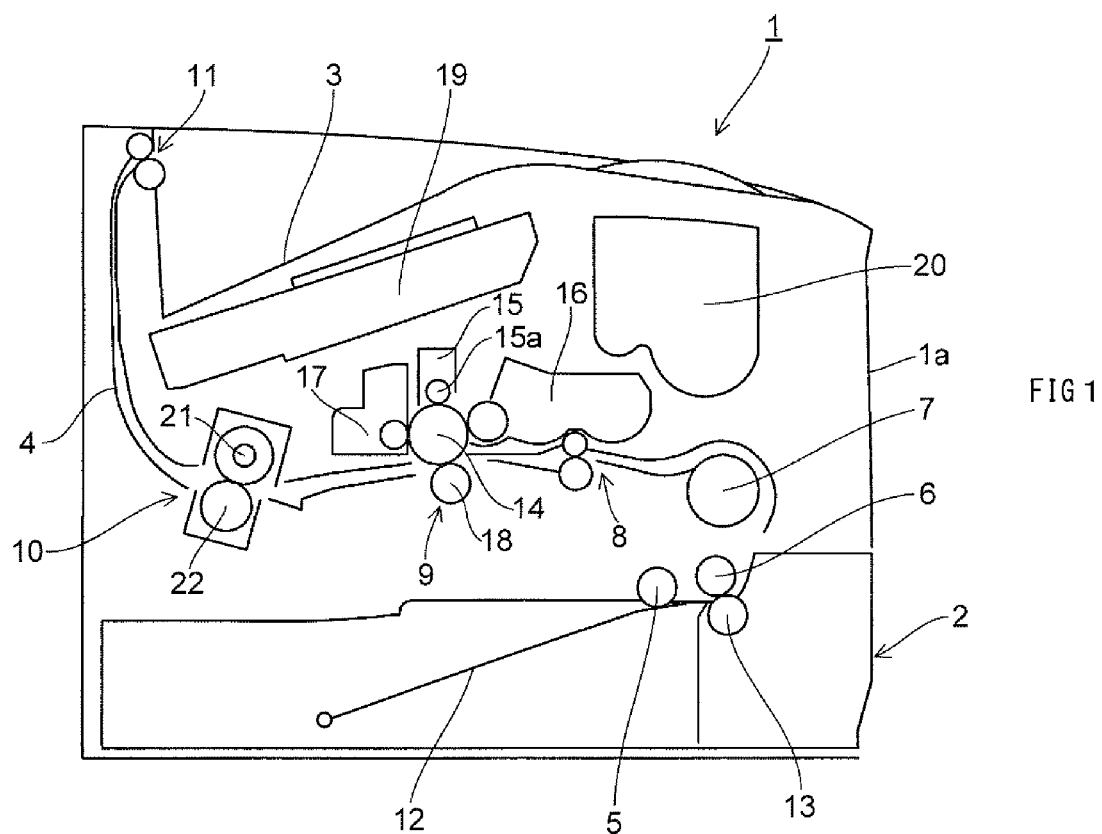
FIG. 1 is a cross sectional view showing a simplified configuration of an image-forming device according to an embodiment of the present disclosure.

FIG. 1 is schematic drawing showing the overall schematic of an image-forming device according to an embodiment of the present disclosure, and depicts the right side of the image-forming device as being the front side. A paper supply cassette 2 that accommodates a stack of paper is disposed in the bottom section of a device chassis 1a of the image-forming device 1. To the upper side of the paper supply cassette 2 there is formed a paper conveyance path 4 that extends substantially horizontally from the front to the back of the device chassis 1a, and then extends upward, leading to a paper ejection section 3 formed on the upper face of the device chassis 1a. Along this paper conveyance path 4 are disposed, in order from the upstream side, a pickup roller 5, a feed roller 6, an intermediate conveyance roller 7, a resist roller pair 8, an image formation section 9, a fixation section 10, and a discharge roller pair 11.

The paper supply cassette 2 is furnished with a paper stacking plate 12 rotatably supported in the paper supply cassette 2. The paper stacked on the paper stacking plate 12 is transported towards the paper conveyance path 4 by the pickup roller 5, and in a case in which multiple sheets of paper have been transported at the same time by the pickup roller 5, the paper is manipulated by the feed roller 6 and a retard roller 13 such that only the uppermost single sheet is conveyed. The paper transported to the paper conveyance path 4 is directionally changed so as to be conveyed towards the rear of the device chassis 1a by the intermediate conveyance roller 7, the paper being conveyed to the resist roller pair 8, the timing being adjusted by the resist roller pair 8, and the paper being supplied to the image formation section 9.

The image formation section 9 is designed to form a predetermined toner image on the paper by an electrophotographic process, and in FIG. 1 is constituted by a photoreceptor 14 which is an image carrier that is supported in clockwise-rotatable fashion, and, disposed about the perimeter of this photoreceptor 14, a charging device 15, a developing device 16, a cleaning device 17, a transfer roller 18 disposed so as to face the photoreceptor 14 across the paper conveyance path 4, and a light scanning device 19 disposed above the photoreceptor 14. A toner container 20 for resupplying the developing device 16 with toner is disposed above the developing device 16.

The charging device 15 is provided with a conductive rubber roller 15a, and this conductive rubber roller 15a is disposed so as to abut the photoreceptor 14. When the photoreceptor 14 rotates, the conductive rubber roller 15a is driven through being in contact with the surface of the photoreceptor 14, at which time a predetermined voltage is applied to the conductive rubber roller 15a, to uniformly charge the surface of the photoreceptor 14.

Next, an electrostatic latent image based on input image data is formed on the photoreceptor 14 by a light beam output by the light scanning device 19, and toner is deposited on the electrostatic latent image by the developing device 16, forming a toner image on the surface of the photoreceptor 14. Paper is then supplied at predetermined timing from the resist roller pair 8 to a nip section (transfer position) of the photoreceptor 14 and the transfer roller 18, and the toner image on the surface of the photoreceptor 14 is transferred onto the paper by the transfer roller 18.

The paper onto which the toner image has been transferred is separated from the photoreceptor 14 and conveyed towards the fixation section 10. This fixation section 10 is disposed to the downstream side of the image formation section 9 in the paper conveyance direction, and the paper onto which the toner image has been transferred in the image formation section 9 is heated and pressed by a heated roller 21 provided to the fixation section 10, and a pressure roller 22 that is pressed against this heated roller 21, fixing the toner image which has been transferred to the paper.

Once the image has been formed, the paper is discharged to the paper ejection section 3 by the discharge roller pair 11. Meanwhile, any toner remaining on the surface of the photoreceptor 14 subsequent to transfer is removed by the cleaning device 17, whereupon the photoreceptor 14 is recharged by the charging device 15, and image formation is performed analogously thereafter.

Figure 2:
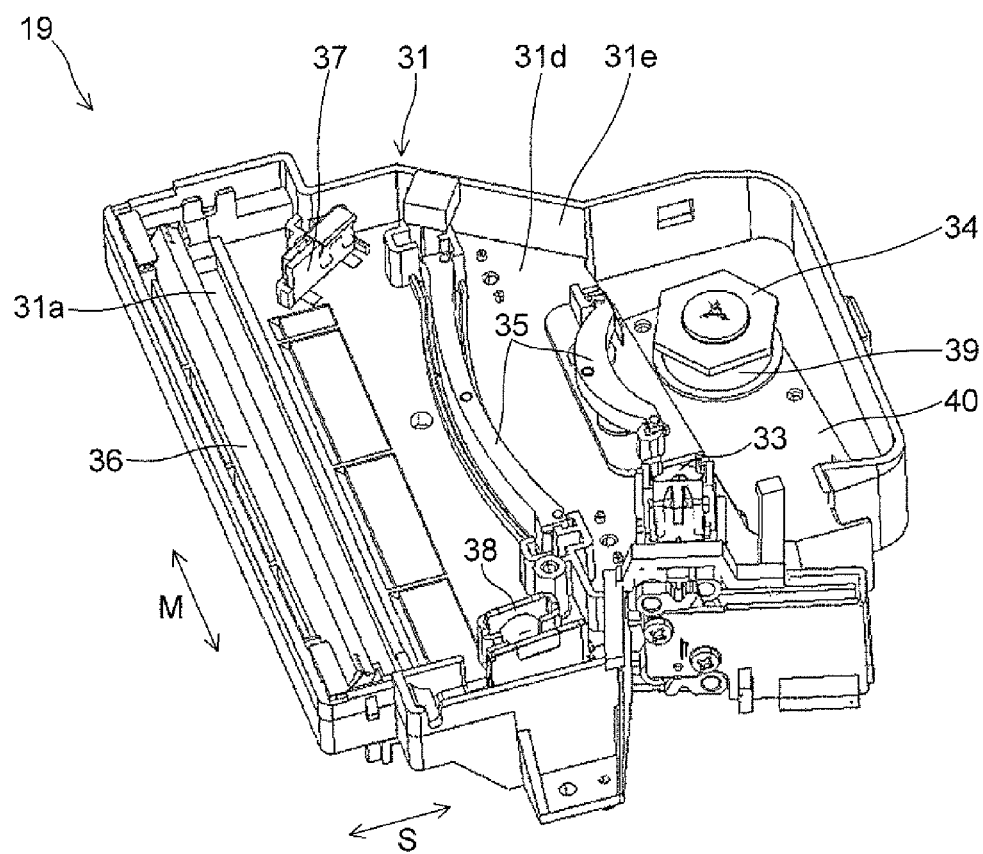
FIG. 2 is a perspective view showing a light scanning device employed in an image-forming device according to an embodiment of the present disclosure.

FIG. 2 is a perspective view showing the light scanning device 19 employed in the image-forming device 1. In FIG. 2, the top lid of the housing has been removed in order to show the constitution of the interior of the light scanning device 19.

The light scanning device 19 is provided with a light source section 33; a polygon mirror 34 which is a rotating polygonal mirror; a scanning optical system 35; and a fold mirror 36; as well as with a detection sensor 38.

The light source section 33 has a light source such as a laser diode or the like for putting out laser light, and a cylindrical lens, collimator lens, or the like for shaping the beam diameter of the laser light. A light beam that has been modulated based on image data input from a PC or the like (not shown) is output.

The polygon mirror 34 is rotated at a predetermined speed by a polygon motor 39, and the light beam output by the light source section 33 is deflected so as to be scanned in a main scanning direction M. Driving of the polygon motor 39 is controlled by a circuit board 40.

The scanning optical system 35 is constituted of a plurality of lenses, and is adapted to convert the light beam reflected from the polygon mirror 34, so as to scan it at a constant speed in the main scanning direction M, as well as to image the light beam onto the scanned surface. The light beam output by the scanning optical system 35 is reflected by the fold mirror 36 towards the lower side of the scanning optical system 35, and guided to the photoreceptor 14 (see FIG. 1).

The detection sensor 38 puts out a signal for controlling the exposure range in the main scanning direction M, and receives the light beam that has passed through the scanning optical system 35 via a detection mirror 37 disposed outside the exposure range.

In the aforementioned constitution, the light source section 33 outputs to the polygon mirror 34 a light beam modulated based on image data. The polygon mirror 34 reflects the light beam output by the light source section 33, and deflects and scans the reflected light through rotation thereof The scanning optical system 35 converts the light beam reflected by the polygon mirror 34 to a constant-velocity scan, which is imaged onto the scanned surface, i.e., the photoreceptor 14 (see FIG. 1), via the fold mirror 36. The light scanning device 19 thereby carries out scanned exposure of a predetermined range in the main scanning direction M on the photoreceptor 14, forming an electrostatic latent image on the photoreceptor 14.

The light source section 33, the polygon mirror 34, the scanning optical system 35, the fold mirror 36, and the like are arranged inside the housing 31.

The housing 31 is formed of resin with good heat conduction, and has a bottom wall section 31d of flat plate shape, a side wall section 31e rising up from the peripheral edge of the bottom wall section 31d, and a top lid (not illustrated) of flat plate shape, attached to the top edge of the side wall section 31e. The light source section 33, the polygon mirror 34, the scanning optical system 35, the fold mirror 36, and the like are accommodated inside a space formed by the bottom wall section 31d, the side wall section 31e, and the top lid.

The scanning optical system 35, the detection mirror 37, and the detection sensor 38 are affixed at predetermined positions on the bottom wall section 31d. The polygon mirror 34 is integrally attached to a rotating shaft of the polygon motor 39, and the polygon motor 39 is affixed to the bottom wall section 31d, with the circuit board 40 interposed. The circuit board 40 has mounted thereon a driver IC or the like for controlling the driving of rotation of the polygon motor 39, and is affixed to the bottom wall section 31d. When the polygon motor 39 rotates for an extended time at high speed, the rotating shaft of the polygon motor 39 and the bearing emit heat, heat is emitted from the driver IC or the like of the circuit board 40 as well, and the interior of the housing 31 rises in temperature. The circuit board 40 may be arranged in another part of the bottom wall section 31d, or arranged in the top section of the housing 31 such as the top lid or the like.

In order to bring about reflection towards the photoreceptor 14 (see FIG. 1) of the light beam output by the scanning optical system 35, the fold mirror 36 is inclined by a predetermined angle with respect to the bottom wall section 31d and affixed to the bottom wall section 31d. In order to output the light beam via the fold mirror 36 to the photoreceptor 14 from inside the housing 31, an output window 31a is formed in the bottom wall section 31d. The output window 31a is formed nearby the fold mirror 36, and comprises an opening that extends in the main scanning direction M at about the same length as the fold mirror 36, which is horizontally elongated.

Figure 3:
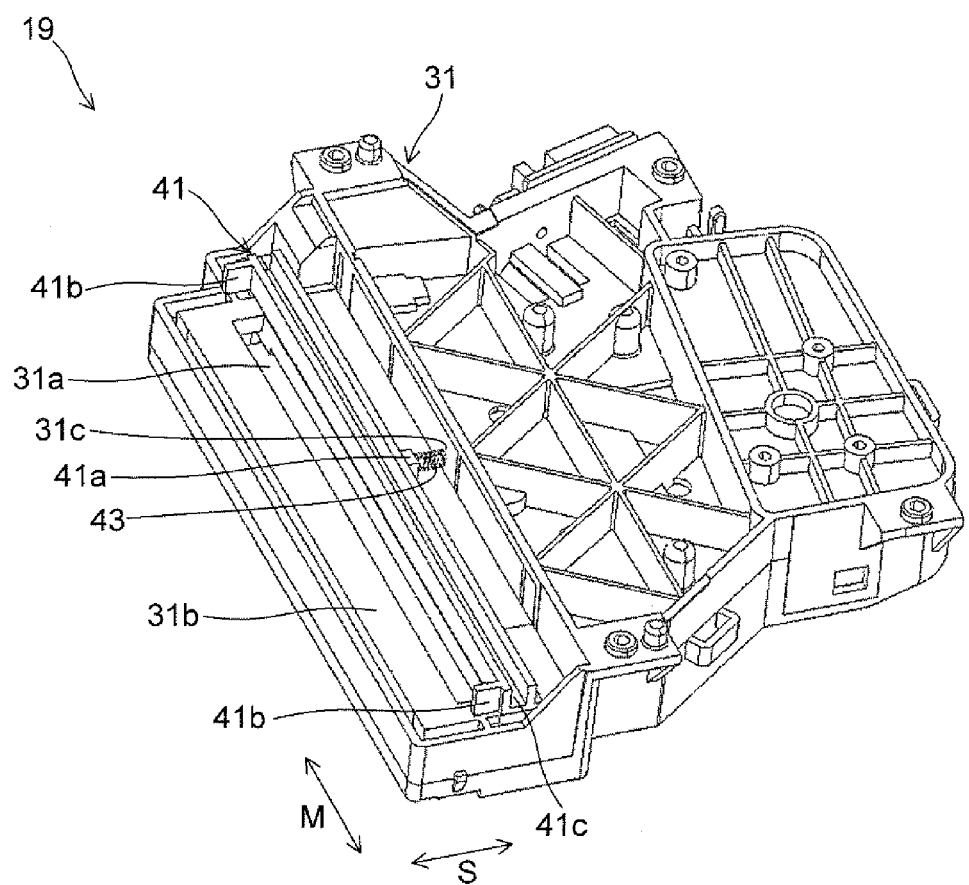
FIG. 3 is a perspective view showing the bottom face section of a light scanning device according to an embodiment of the present disclosure.
Figure 4:
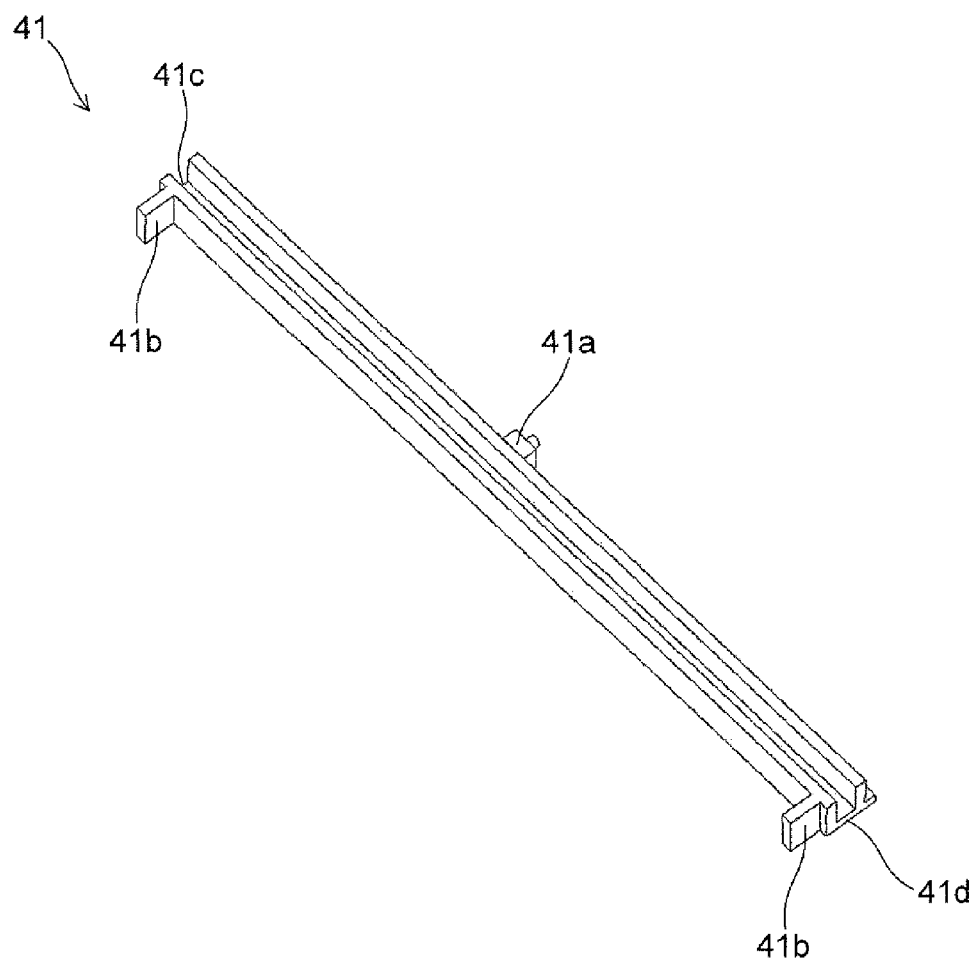
FIG. 4 is a perspective view showing a shutter member employed in a light scanning device according to an embodiment of the present disclosure.
Figure 5:
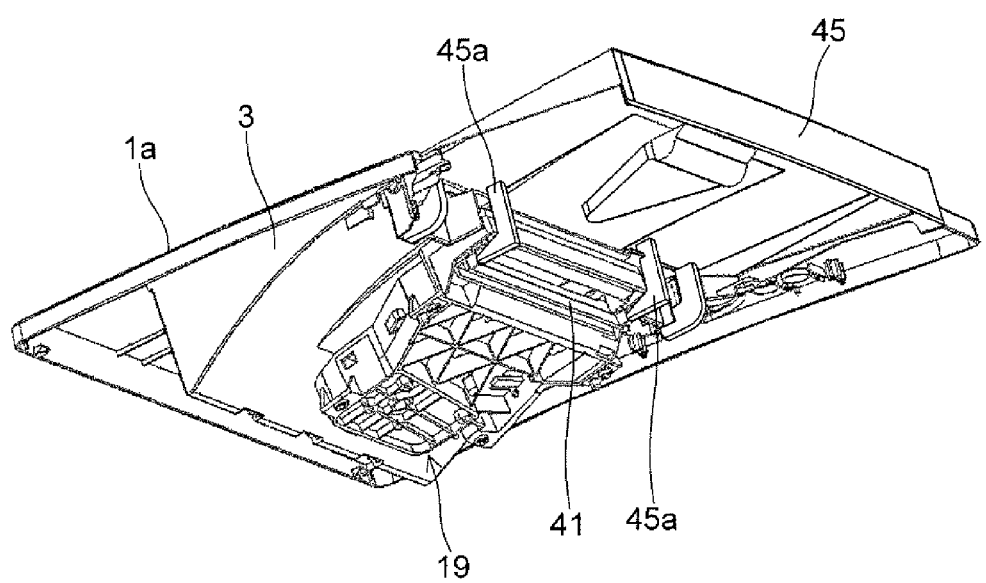
FIG. 5 is a perspective view showing the placement constitution of a shutter member and a cover member according to an embodiment of the present disclosure.
Figure 6:
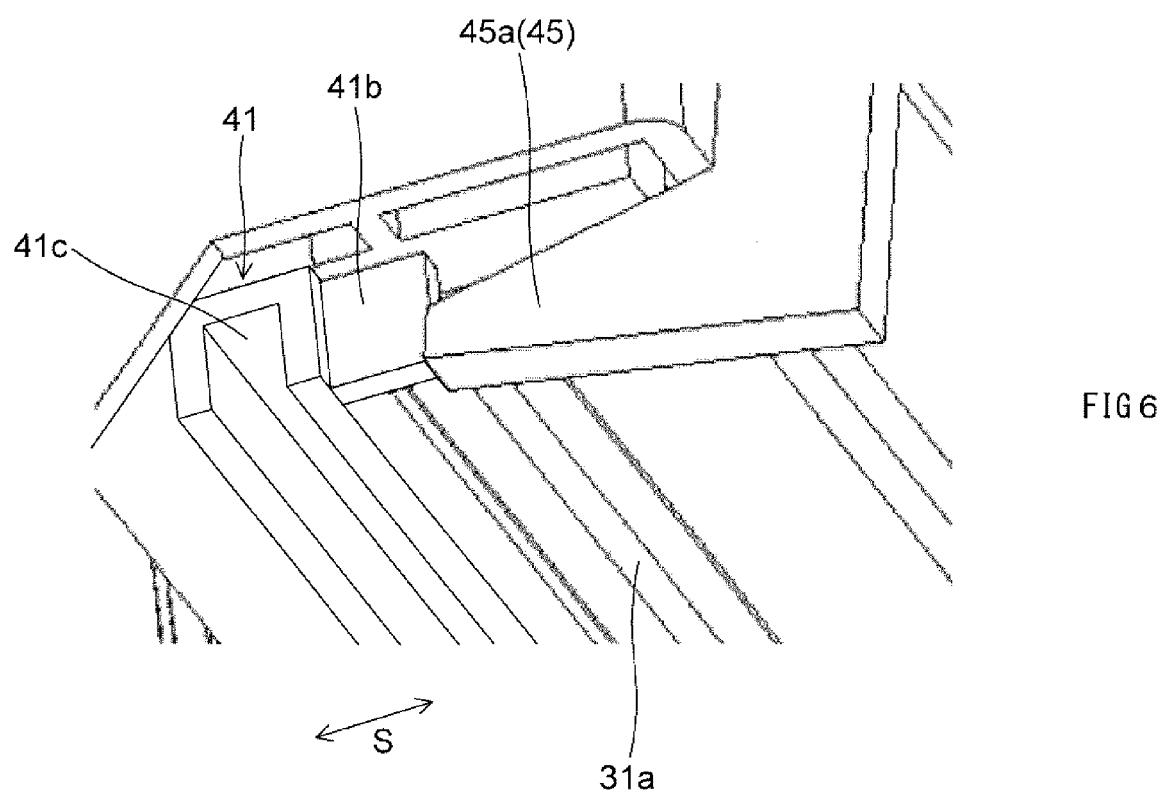
FIG. 6 is a perspective view showing the cover member in a state pushing the shutter member towards the open direction according to an embodiment of the present disclosure.

The output window 31a is opened and shut by a shutter member 41 shown in FIG. 3 to FIG. 6. FIG. 3 is a perspective view showing the bottom face section of the light scanning device 19 having the shutter member 41, FIG. 4 is a perspective view showing the shutter member 41, and FIG. 5 is a perspective view showing the placement constitution of the shutter member 41 and a cover member 45. FIG. 6 is a partially enlarged view of the abutted section of the cover member 45 and the shutter member 41 in FIG. 5, showing the cover member 45 in a state pushing the shutter member 41 towards the open direction. FIG. 5 shows a principal section in a state in which the interior of the device chassis 1a is closed up by the cover member 45.

As shown in FIG. 3, in order to open and shut the output window 31a, the shutter member 41 is arranged moveably in a secondary scanning direction S orthogonal to the main scanning direction M. When the shutter member 41 is disposed in the state of FIG. 3, the output window 31a opens, and it becomes possible for a light beam to be output towards the photoreceptor 14 from the output window 31a. On the other hand, when the shutter member 41 has moved in the leftward direction of FIG. 3 in the secondary scanning direction S, the output window 31a is shut by the shutter member 41, so toner, particulate contaminants, and the like cannot enter inside the housing 31 through the output window 31a.

The shutter member 41 has a horizontally elongated constitution that is longer in the main scanning direction M than the output window 31a and wider than the output window 31, so as to shut the output window 31a. The shutter member 41 has a spring receiving section 41a serving as a supporting section for supporting in elastically deformable fashion a spring member 43 serving as an urging member, a pair of protruding sections 41b that engage the cover member 45 (see FIG. 5), discussed later, a ventilation passage 41c for cool air to pass through in the main scanning direction M, and a sliding face 41d (see FIG. 4) for sliding along the outside surface 31b of the housing 31. Further, the shutter member 41 is formed from a resin with good heat conduction, to have the aforementioned shape.

The spring receiving section 41a is formed in the substantially central section in the lengthwise direction of the shutter member 41, and together with a spring retaining section 31c formed in the housing 31, supports the spring member 43. The spring member 43, which comprises a compression coil spring, urges the shutter member 41 in the closing direction (the leftward direction of the secondary scanning direction S in FIG. 3). By virtue of the shutter member 41 being urged in the leftward direction of FIG. 3 by the spring member 43, the sliding face 41d (see FIG. 4) of the shutter member 41 slides along the outside surface 31b of the housing 31, and the shutter member 41 shuts the output window 31a.

As shown in FIG. 5, the light scanning device 19 is arranged adjacently below the paper ejection section 3 of the device chassis 1a, and the cover member 45 is arranged to the front side of the paper ejection section 3. The cover member 45 is rotatably furnished to the top surface of the device chassis 1a. When the cover member 45 is rotated counterclockwise in FIG. 5 about a center nearby the paper ejection section 3, the inside of the device chassis 1a is opened up; on the other hand, when the cover member 45 is rotated clockwise, the inside of the device chassis 1a is closed up. When the inside of the device chassis 1a has been opened up, replacement of the toner container 20 or the photoreceptor 14 (see FIG. 1), a paper jam process in the image formation section 9 (see FIG. 1), or the like is possible. At this time, through an opening up operation of the cover member 45, the shutter member 41 shuts the output window 31a by an actuating mechanism discussed later, whereby toner, particulate contaminants, or the like, which may be floating around due to replacement of the toner container 20, to a paper jam process, or the like, will not enter the housing 31 through the output window 31a. When the inside of the device chassis 1a has been closed up, in association with operation of the cover member 45, the shutter member 41 opens the output window 31a using the actuating mechanism, and it is possible for a light beam to be output towards the photoreceptor 14 from the output window 31a.

A pair of projecting sections 45a serving as engagement sections are formed on the inner wall side of the cover member 45. Each of the projecting sections 45a is furnished extending in an "L" shape downward from the cover member 45, and is disposed facing the end section side in the lengthwise direction of the shutter member 41.

As shown in FIG. 6, the projecting sections 45a of the cover member 45 are constituted so as to be capable of abutting against protruding sections 41b that have been formed on the shutter member 41. The protruding sections 41b are formed projecting to the lengthwise end section at the surface on the opposite side from the surface on which the spring receiving section 41a of the shutter member 41 has been formed (see FIG. 4), and due to the urging force of the spring member 43 (see FIG. 3) are pressed in a direction of abutment against the projecting sections 45a. The pair of protruding sections 41 and the spring member 43 constitute the actuating mechanism.

With the cover member 45 in a state of having closed off the interior of the device chassis 1a, the projecting sections 45a of the cover member 45 abut the protruding sections 41b of the shutter member 41, and the shutter member 41 opens the output window 31a. In this state, when the cover member 45 is rotated to the right side in FIG. 6 (the counterclockwise direction of FIG. 5) in order to open up the inside of the device chassis 1a, the projecting sections 45a separate from the protruding sections 41b of the shutter member 41, and the shutter member 41 is moved to the right side in FIG. 6 by the urging force of the spring member 43 (see FIG. 3), shutting the output window 31a. On the other hand, when the cover member 45 is returned to the left side in FIG. 6 (the clockwise direction of FIG. 5) in order to close up the inside of the device chassis 1a, the projecting sections 45a abut the protruding sections 41b of the shutter member 41, and in association with actuated rotation of the cover member 45, the shutter member 41 is pushed to the state of FIG. 6 in opposition to the urging force of the spring member 43 (see FIG. 3), opening the output window 31a.

In the aforementioned embodiment, the actuating mechanism is shown to have a constitution that includes the spring member 43 for urging the shutter member 41 in the closing direction, and the protruding sections 41b for pushing the shutter member 41 in the open direction; however, the present disclosure is not limited to this, and the actuating mechanism may have a constitution in which the spring member 43 urges the shutter member 41 in the open direction, and the protruding sections 41b push the shutter member 41 in the closing direction. Moreover, the projecting sections 45 are not limited to having an "L"-shaped constitution; any appropriate predetermined shape may be adopted according to the constitution and direction of manual operation, such as a rotation operation or sliding operation of the cover member 45; or on the placement relationships of the cover member 45 and the shutter member 41, and the like.

Figure 7:
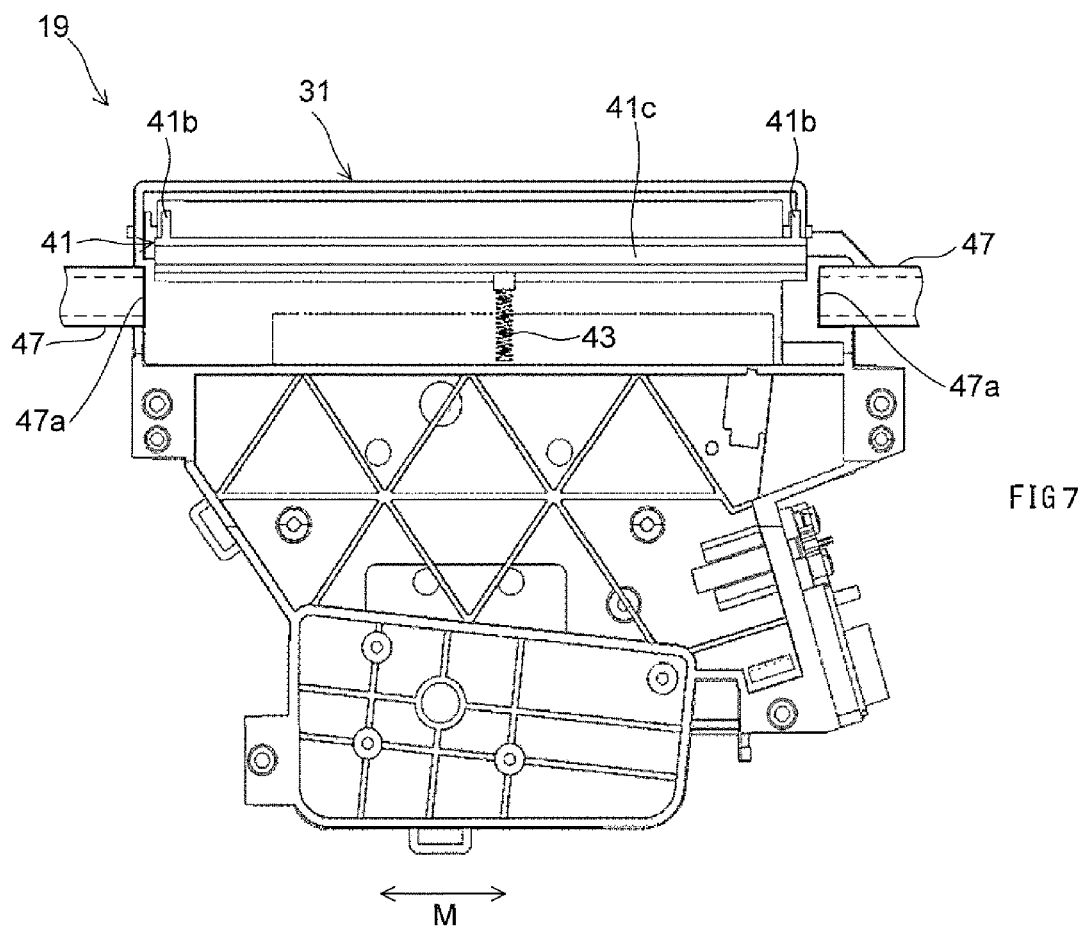
FIG. 7 is a plan view showing the bottom face section in a state in which the output window is closed by the shutter member according to an embodiment of the present disclosure.
Figure 8:
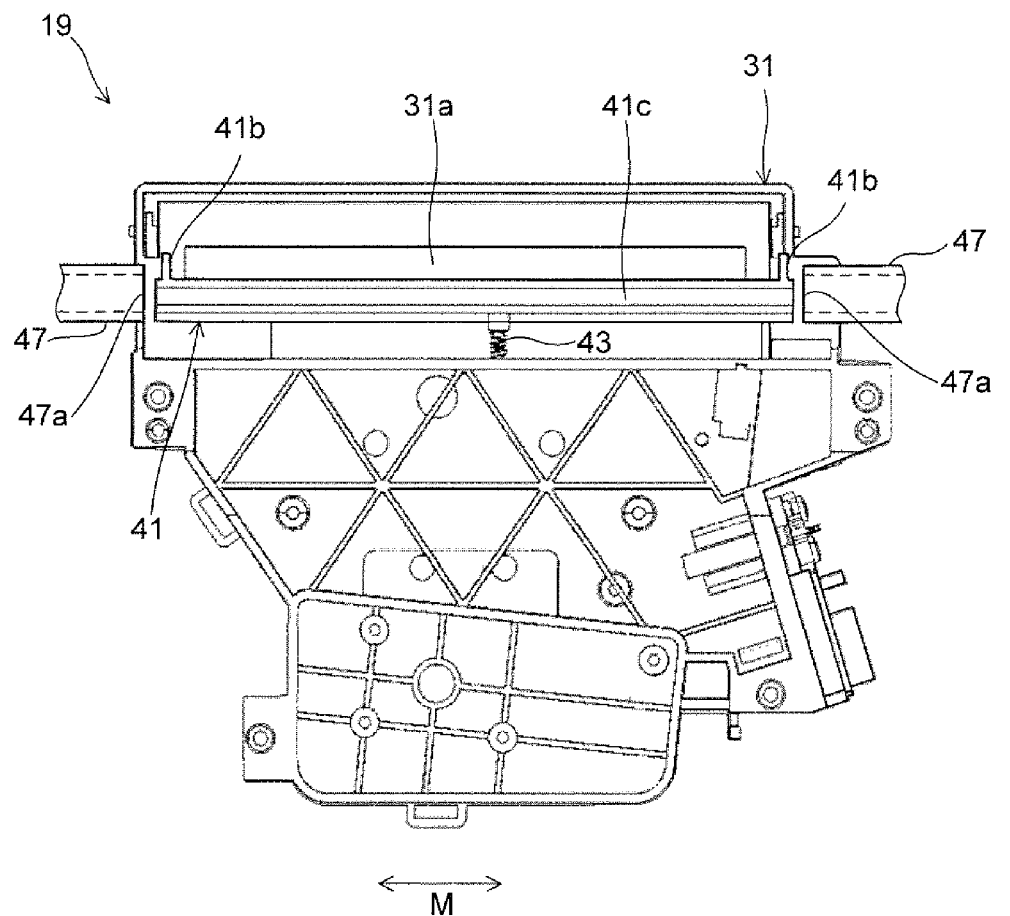
FIG. 8 is a plan view showing the bottom face section in a state in which the output window is opened by the shutter member according to an embodiment of the present disclosure.

FIG. 7 and FIG. 8 are plan views showing the placement of the shutter member 41 and ducts 47. FIG. 7 shows the bottom face section of the light scanning device 19 in a state in which the shutter member 41 is shut, and FIG. 8 shows the bottom face section of the light scanning device 19 in a state in which the shutter member 41 is open. In FIG. 7 and FIG. 8, the cover member 45 has been omitted.

As shown in FIG. 7, a pair of ducts 47 are arranged at either end in the M direction (main scanning direction) of the housing 31. The ducts 47 are conduits for guiding cool air into the housing 31, and for discharging air that has passed through the housing 31. Each of the ducts 47 has a ventilation opening 47a facing one end of the housing 31. One of the ventilation openings 47a faces a first end of the housing 31, while the other ventilation opening 47a faces the other end of the housing 31, with the ventilation openings 47a disposed facing one another in the M direction via the housing 31. A blower fan, not illustrated, is arranged at the opposite end of the ventilation opening 47a of one of the ducts 47, so it is possible for cool air from the blower fan to be sent to the light scanning device 19 from the ventilation opening 47a through the inside of the duct 47.

A ventilation passage 41c extending in the M direction is formed in the shutter member 41. The ventilation passage 41c is formed to pass through in the M direction in the form of a slot having a "U" shaped cross section that opens up on the opposite side from the sliding face 41d (see FIG. 4). Because the ventilation passage 41c is constituted by a slot, the shutter member 41 can be simply formed. Optionally, a ventilation passage 41c of hole form passing though the inside of the shutter member 41 in the M direction may be furnished in place of the ventilation passage 41c of slot form.

When the cover member 45 is open (see FIG. 5), the shutter member 41 is retained by the actuating mechanism (the spring member 43) at a position shutting the output opening 31a, making possible replacement of the toner container 20 (see FIG. 1), or a paper jam process, or the like, without toner or particulate contaminants entering inside the housing 31. Once replacement of the toner container or the paper jam process is finished, and the cover member 45 is closed up, the cover member 45 pushes the protruding sections 41b of the shutter member 41, whereby the shutter member 41 is moved by the actuating mechanism (the protruding sections 41b) to a position opening the output window 31a (see FIG. 8).

As shown in FIG. 8, when the shutter member 41 is at a position opening the output window 31a, both end sections of the ventilation passage 41c are disposed so as to face the ventilation openings 47a of the ducts 47. Consequently, cool air from the blower fan is sent through the inside of one duct 47 and into the ventilation passage 41c from the ventilation opening 47a. The air having passed through the inside of the ventilation passage 41c is sent to the inside of the other duct 47 from the ventilation opening 47a, and discharged to the outside of the device chassis 1a from this other duct 47.

Herein, when the driver IC of the circuit board 40 or the like is actuated, or the polygon motor 39 is driven, in order to perform image formation, cool air sent to the ventilation passage 41c from the duct 47 cools the outside surface 31b of the housing 31 via the shutter member 41. On the other hand, the heat emitted by the bearing section of the polygon motor 39 or by high-temperature portions such as the retaining section of the circuit board 40 or the like is conducted to the outside surface 31b via the bottom wall section 31d, and is cooled by the cool air passing through the ventilation passage 41c. Rise in temperature inside the housing 31 is sufficiently minimized thereby.

The present disclosure can be utilized in a light scanning device employed in an image-forming device, such as a photocopier, printer, or fax, or an all-in-one device thereof, in a bar code reader, or in a projector; and, in particular, can be utilized in an image-forming device for scanned exposure of the surface of an image carrier to form a latent image on the image carrier.

What is claimed is:

1. An image-forming device, comprising:
   a light source section for outputting a light beam;
   a rotating polygonal mirror for scanning the light beam from the light source section in a main scanning direction;
   an image carrier that is irradiated by the light beam scanned by the rotating polygonal mirror, whereby a latent image is formed;
   a housing for housing the light source section and the rotating polygonal mirror, the housing having an output window through which the light beam scanned in the main scanning direction is outputted towards the image carrier;
   a shutter member that has a ventilation passage formed extending therethrough in the main scanning direction, the shutter member adapted to slide over the outside surface of the housing in a secondary scanning direction orthogonal to the main scanning direction in order to open and shut the output window;
   a cover member provided to open or close the interior of a chassis of the device; and
   an actuating mechanism for moving the shutter member to a position where the output window is opened or a position where the output window is closed, in association with an opening up or closing up operation performed by the cover member;
   the actuating mechanism having an urging member for urging the shutter member towards the closing direction, the urging member being arranged between the housing and the shutter member; and a protruding section pushed in the opening direction of the shutter member through a closing up operation of the cover member, the protruding section being formed on the shutter member;
   the shutter member having a supporting section;
   the supporting section supporting one end section of the urging member in an elastically deformable manner;
   the protruding section being formed on a surface on a side opposite the supporting section with respect to the ventilation passage;
   the shutter member being moved to the closing position by the actuating mechanism when the cover member is opened up, and moved to the opening position by the actuating mechanism when the cover member is closed up; and
   the ventilation passage facing a ventilation opening of a duct furnished to the device chassis when the shutter member is in the opening position.

2. The image-forming device of claim 1,
   the supporting section being formed substantially centrally with respect to the main scanning direction, and the protruding sections formed as a pair at either end with respect to the main scanning direction.

3. The image-forming device of claim 1,
   the urging member being a compression coil spring.

4. The image-forming device of claim 1,
   the shutter member having a sliding face opposable relative to the output window and adapted to slide along the outside surface of the housing; and the ventilation passage being formed as a groove of "U" shaped cross section that is open on a side opposite the sliding face.

5. The image-forming device of claim 1,
   the housing being formed using a heat-conducting resin.

6. The image-forming device of claim 1,
   the shutter member being formed using a heat-conducting resin.

7. The image-forming device of claim 1,
   a toner container for resupplying a developing device with toner being replaceable when the cover member is opened up, and the output window being arranged in proximity to the toner container.

8. The image-forming device of claim 1,
   the ducts being arranged in a pair facing either end of the housing in the scanning direction; and
   one of the ducts guiding cool air to the ventilation passage, and the other duct discharging air that has passed through the ventilation passage.

9. A light scanning device, comprising:
   a light source section for outputting a light beam;
   a rotating polygonal mirror for scanning the light beam from the light source section in a main scanning direction;
   a housing for housing the light source section and the rotating polygonal mirror, the housing having an output window through which the light beam scanned in the main scanning direction is outputted towards a scanned surface;
   a shutter member that has a ventilation passage formed extending therethrough in the main scanning direction, the shutter member adapted to slide over the outside surface of the housing in a secondary scanning direction orthogonal to the main scanning direction in order to open and shut the output window; and
   an actuating mechanism for moving the shutter member to a position where the output window is opened or a position where the output window is closed, in association with an opening up or closing up operation performed by a cover member provided to open or close the interior of a chassis of a device to which the light scanning device is attached;
   the actuating mechanism having an urging member for urging the shutter member towards the closing direction, the urging member being arranged between the housing and the shutter member; and a protruding section pushed in the opening direction of the shutter member through a closing up operation of the cover member, the protruding section being formed on the shutter member;
   the shutter member having a supporting section;
   the supporting section supporting one end section of the urging member in an elastically deformable manner;
   the protruding section being formed on a surface on a side opposite the supporting section with respect to the ventilation passage;
   the shutter member being moved to the closing position by the actuating mechanism when the cover member is opened up, and moved to the opening position by the actuating mechanism when the cover member is closed up; and
   the ventilation passage facing the ventilation opening of a duct furnished to the device chassis when the shutter member is in the opening position.

10. The light scanning device of claim 9,
the supporting section being formed substantially centrally with respect to the main scanning direction, and the protruding sections formed as a pair at either end with respect to the main scanning direction.

11. The light scanning device of claim 9,
the urging member being a compression coil spring.

12. The light scanning device of claim 9,
the shutter member having a sliding face opposable relative to the output window and adapted to slide along the outside surface of the housing; and the ventilation passage being formed as a groove of "U" shaped cross section that is open on a side opposite the sliding face.

13. The light scanning device of claim 9,
the housing being formed using a heat-conducting resin.

14. The light scanning device of claim 9,
the shutter member being formed using a heat-conducting resin.

\* \* \* \* \*